(12) United States Patent
Gumaste (10) Patent No.: US 7,715,711 B2
(45) Date of Patent: May 11, 2010

(54) WAVELENGTH SELECTIVE SWITCH DESIGN CONFIGURATIONS FOR MESH LIGHT-TRAILS

(75) Inventor: Ashwin A. Gumaste, Dallas, TX (US)

(73) Assignee: Fujitsu Limited, Kawasaki (JP)

( * ) Notice: Subject to any disclaimer, the term of this patent is extended or adjusted under 35 U.S.C. 154(b) by 856 days.

(21) Appl. No.: 11/420,380

(22) Filed: May 25, 2006

(65) Prior Publication Data

US 2007/0274724 A1 Nov. 29, 2007

(51) Int. Cl.
 *H04J 14/02* (2006.01)
(52) U.S. Cl. .............................. 398/45; 398/43; 398/48; 398/49; 398/50; 398/83
(58) Field of Classification Search ............. 398/48–51, 398/82, 45, 55–57
See application file for complete search history.

(56) References Cited

U.S. PATENT DOCUMENTS

| | | | | | |
|---|---|---|---|---|---|
| 5,737,103 | A | * | 4/1998 | Jackel ........................... | 398/56 |
| 5,953,141 | A | * | 9/1999 | Liu et al. ...................... | 398/83 |
| 6,122,096 | A | * | 9/2000 | Fatehi .................... | 359/337.21 |
| 6,292,599 | B1 | * | 9/2001 | Augustsson ................... | 385/16 |
| 6,333,799 | B1 | * | 12/2001 | Bala et al. ...................... | 398/9 |
| 6,626,590 | B1 | * | 9/2003 | Nagatsu et al. ............... | 398/59 |
| 7,292,786 | B1 | * | 11/2007 | Barbarossa et al. ........... | 398/83 |
| 7,519,293 | B1 | * | 4/2009 | Norman ......................... | 398/5 |
| 2002/0093707 | A1 | * | 7/2002 | Katagiri et al. ............ | 359/124 |
| 2002/0186432 | A1 | * | 12/2002 | Roorda et al. ............... | 359/128 |
| 2004/0208551 | A1 | * | 10/2004 | Weverka ...................... | 398/50 |
| 2004/0208555 | A1 | * | 10/2004 | Pau et al. ...................... | 398/56 |
| 2005/0201749 | A1 | * | 9/2005 | Wang et al. .................. | 398/12 |
| 2005/0226551 | A1 | * | 10/2005 | Pichler et al. ................. | 385/17 |
| 2006/0013586 | A1 | * | 1/2006 | Pichler et al. ................ | 398/50 |
| 2006/0034610 | A1 | * | 2/2006 | Akiyama et al. ............. | 398/83 |
| 2006/0093258 | A1 | * | 5/2006 | Terahara et al. ............... | 385/18 |
| 2006/0098981 | A1 | * | 5/2006 | Miura et al. .................. | 398/45 |
| 2006/0171717 | A1 | * | 8/2006 | Kikuchi ....................... | 398/83 |
| 2006/0210266 | A1 | * | 9/2006 | Aoki ........................... | 398/19 |
| 2006/0239607 | A1 | * | 10/2006 | Yamamoto et al. ........... | 385/16 |
| 2007/0286605 | A1 | * | 12/2007 | Feuer et al. ................... | 398/83 |
| 2008/0138068 | A1 | * | 6/2008 | Akiyama et al. ............. | 398/50 |
| 2008/0181605 | A1 | * | 7/2008 | Palacharla et al. ............ | 398/50 |

OTHER PUBLICATIONS

Ashwin Gumaste and Imrich Chlamtac, Mesh Implementation of Light-trails: A Solution to IP Centric Communication, 2003, Center of Advance Telecommunications Systems and Services, 6 pages.*
Gumaste, et al., *Mesh Implementation of Light-trails: A Solution to IP Centric Communication*, ICCCN (6 pages), 2003.

\* cited by examiner

*Primary Examiner*—Ken N Vanderpuye
*Assistant Examiner*—Tanya Ngo
(74) *Attorney, Agent, or Firm*—Baker Botts L.L.P.

(57) ABSTRACT

In accordance with the teachings of the present invention, wavelength selective switch (WSS) design configurations for mesh light-trails are provided. In a particular embodiment, a node included in an optical network comprises a first light access unit operable to add or drop local traffic and a first WSS assembly communicatively coupled to the first light access unit and comprising at least four WSSs, at least two input ports, and at least four output ports, the four WSSs configured to direct any input traffic in any wavelength received at one of the input ports to the first light access unit and/or to any of the output ports.

14 Claims, 3 Drawing Sheets

WAVELENGTH SELECTIVE SWITCH DESIGN CONFIGURATIONS FOR MESH LIGHT-TRAILS

TECHNICAL FIELD OF THE DISCLOSURE

The present invention relates generally to optical networks and, more particularly, to wavelength selective switch design configurations for mesh light-trails

BACKGROUND

Telecommunication systems, cable television systems, and data communication networks use optical networks to rapidly convey large amounts of information between remote points. In an optical network, information is conveyed in the form of optical signals through optical fibers. Optical fibers comprise thin strands of glass capable of transmitting optical signals over long distances with very low loss of signal strength.

In recent years, the use of telecommunication services has increased dramatically. As the demand for telecommunication services continues to grow, optical networks are quickly becoming overburdened by the increasing amount of information communicated over such networks. The addition of new networks or the expansion of existing networks may however be too costly to be practical solutions to this problem. Thus, efficient use of network resources has become an important goal in developing and operating optical networks.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth of the channels. By using WDM add/drop equipment at network nodes, the entire composite signal can be fully demultiplexed into its constituent channels and switched (added/dropped or passed through).

In WDM and DWDM networks, traffic from one network node to another network node is often assigned to a particular wavelength on which the traffic is communicated over the network. By assigning different traffic streams to different wavelengths, interference between different traffic streams is prevented. However, in certain situations, this creates inefficiency in the network. For example, if the traffic from a node that is assigned a particular wavelength does not typically use much of the bandwidth (capacity) associated with the wavelength, then inefficiencies are created.

The use of optical light trails has been proposed to address these inefficiencies. A light-trail is a generalization of a light path (an optical wavelength circuit), where multiple nodes along the path can take part in communication along the path. Thus, a light-trail enables a plurality of nodes included in the light-trail to share the use of an optical wavelength to transmit traffic between the nodes included in the light-trail. Besides addressing some of the inefficiencies discussed above, light-trail communications may also allow optical multicasting and dynamic provisioning.

Although light-trails have been proposed as efficient solutions to some optical networking inefficiencies, a need remains for efficient and reliable optical component configurations to implement light-trails in particular optical networks.

SUMMARY

In accordance with the teachings of the present invention, wavelength selective switch (WSS) design configurations for mesh light-trails are provided. In a particular embodiment, a node included in an optical network comprises a first light access unit operable to add or drop local traffic and a first WSS assembly communicatively coupled to the first light access unit and comprising at least four WSSs, at least two input ports, and at least four output ports, the four WSSs configured to direct any input traffic in any wavelength received at one of the input ports to the first light access unit and/or to any of the output ports.

Technical advantages of one or more embodiments of the present invention may include providing a reliable optical component configuration for implementing light-trails over mesh networks. Light-trails offer an efficient method to communicate over an optical network. By using proven WSS technology in the design configuration to support mesh light-trails, the cost and risk of such a configuration are both lessened, and the benefits of supporting light trails can be realized. Other technical advantages of using a WSS design configuration include the flexibility and low loss of such a design.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
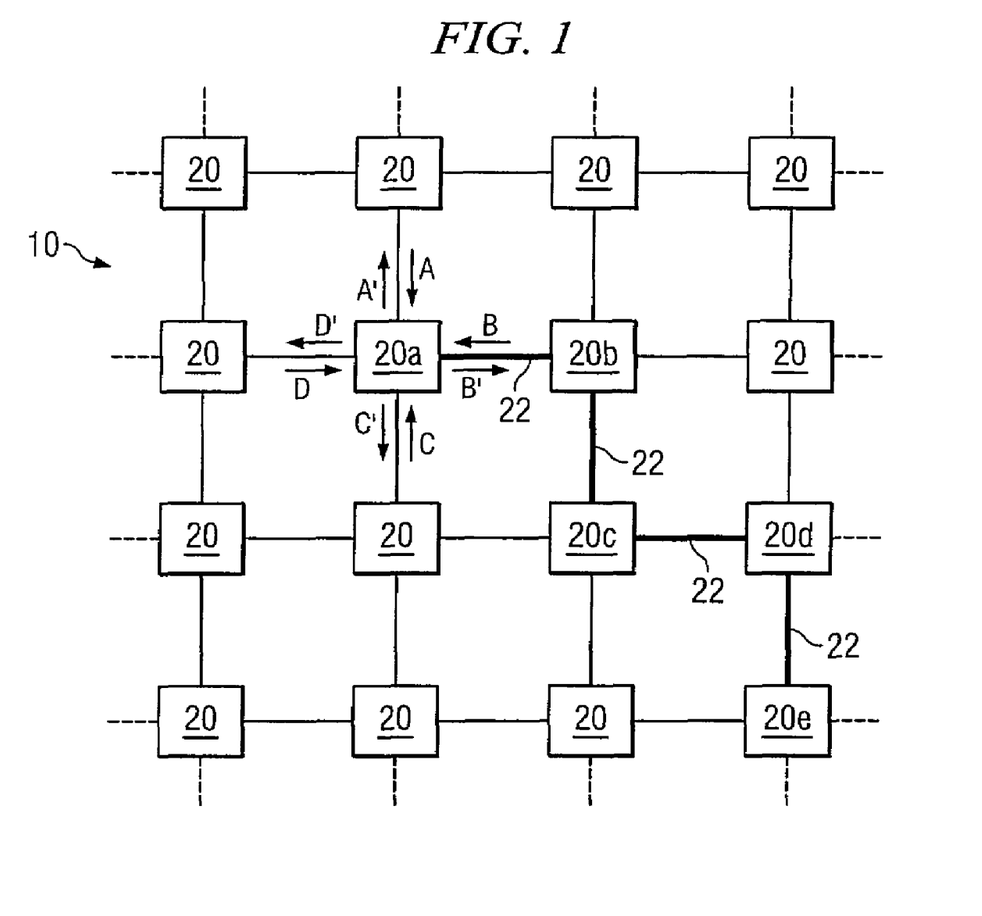
FIG. 1 is a block diagram illustrating a light-trail in a mesh optical network according to a particular embodiment of the present invention.

FIG. 1 is a block diagram illustrating a light-trail 22 in a mesh optical network 10 according to a particular embodiment of the present invention. Mesh optical network 10 may represent all or a portion of a short-haul metropolitan network, a long-haul intercity network, and/or any other suitable network or combination of networks. Mesh optical network 10 comprises a plurality of hubs or nodes 20 interconnected by optical fiber. In the illustrated network 10, each node 20 is coupled to four other nodes to create a mesh. However, any suitable configuration of any suitable number of optical nodes may create mesh network 10. For example, one or more nodes 20 in mesh 10 may have less or more interconnections with other nodes 20. In particular embodiments, there may also be one or more nodes in mesh 10 that do not act as hubs.

Mesh optical network 10 may be operable to communicate optical signals carrying information from one node 20 to one or more other nodes 20. In particular, optical network 10 may allow client devices (not shown) coupled to a node 20 to communicate with one or more other client devices coupled to one or more of the other nodes 20. The optical fiber coupling two nodes 20 may comprise, as appropriate, a single uni-directional fiber, a single bi-directional fiber, or a plurality of uni- or bi-directional fibers. Optical network 10 may comprise a wavelength division multiplexing (WDM) network, a dense wavelength division multiplexing (DWDM) network, or any other suitable multi-channel network to communicate information or "traffic." Thus, traffic may be carried in a number of optical channels or wavelengths in each fiber. As used herein, "traffic" means information transmitted, stored, or sorted in the network. Such traffic may comprise optical signals having at least one characteristic modulated to encode audio, video, textual and/or other suitable data. The data may also be real-time or non-real-time. Modulation may be based on phase shift keying (PSK), intensity modulation (IM), or other suitable methodologies. Additionally, the information comprising the traffic may be structured in any suitable manner.

Nodes 20 in mesh 10 may comprise any suitable nodes operable to transmit and receive traffic in a plurality of wavelengths. In the illustrated embodiment, each node 20 may be operable to transmit traffic directly to four other nodes 20 and receive traffic directly from the four other nodes 20. For example, as illustrated in FIG. 1, node 20a may be capable of receiving input signals A-D from four nodes 20 and forwarding output signals A'-D' to the four nodes. Each output signal, A'-D', can include traffic in one or more wavelengths from one or more of the input signals and/or traffic added at node 20a.

Each node 20 in example mesh 10 may also be operable to participate in an optical light-trail. Nodes that allow light-trail communication have specific characteristics that enable the nodes to implement light-trails. For example, these characteristics include a drop and continue function, where traffic received by an element of the node is both dropped and forwarded so as to allow the traffic to continue along the light-trail. Other node characteristics associated with light-trail communication include the passive adding of traffic by the node. "Passive" in this context generally refers to the adding of traffic without using optical switches that use power, electricity, and/or moving parts. Other node characteristics include the use of control signals in an out-of-band channel instead of control signals that are in-band with the data being communicated on the network. Thus, each node 20 operable to participate in an optical light-trail would exhibit these characteristics.

A light-trail enables a plurality of nodes included in the light-trail to share the use of an optical wavelength to transmit traffic between the nodes included in the light-trail. By having nodes share the use of a wavelength, some of the inefficiencies associated with optical communication in typical optical networks may be overcome. These inefficiencies may include the assignment of a particular wavelength for traffic from one network node to another network node in a typical network even when the two nodes communicate relatively infrequently or do not otherwise use most of the bandwidth of the assigned wavelength. Thus, light-trails generally allow for more efficient use of bandwidth (capacity) in an optical network. Reference is made to patent application Ser. No. 11/080,752 filed Mar. 15, 2005, and entitled System and Method for Implementing Optical Light-Trails, for a more detailed discussion of optical light-trails.

An example mesh light-trail 22, illustrated in FIG. 1, has been established between nodes 20a-20e. Light-trail 22 may allow nodes 20a-20e to share the use of a wavelength to transmit traffic among nodes 20a-20e. In the illustrated embodiment, node 20a may act as a "convener" node and node 20e may act as an "end" node for the light-trail 22 (as described in further detail in patent application Ser. No. 11/080,752 filed Mar. 15, 2005, and entitled System and Method for Implementing Optical Light-Trails). Any of the nodes that are part of the light-trail may transmit optical traffic on the light-trail to nodes located downstream in the light-trail. To prevent optical interference caused by multiple nodes 20a-20e transmitting simultaneously on light-trail 22, nodes 20a-20e may utilize any suitable techniques for sharing the light-trail (examples of which are described in patent application Ser. No. 11/080,752 filed Mar. 15, 2005, and entitled System and Method for Implementing Optical Light-Trails).

It should be noted that a particular node may terminate or reconfigure light-trail 22 at any suitable time. Additionally, in particular embodiments, multiple light-trails may be established in mesh 10, where each light-trail is associated with a particular wavelength. It may even be that multiple light-trails are established across the same nodes 20, such as, for example, multiple light-trails from node 20a to node 20e. Furthermore, multiple, non-overlapping light-trails may be associated with a common wavelength. In mesh network 10, having a node participate in multiple light-trails may require that node to support an optical cross connect function.

In operation, a node 20 may generate optical traffic at one or more wavelengths based on electrical signals received by the node from client devices coupled to the node. Node 20 may add this traffic to optical traffic propagating in one or more directions in mesh 10. For example, as mentioned above, a node may add traffic to one or more defined light-trails. A node 20 may also receive and drop traffic propagating in mesh 10 that is destined for one or more of its clients. For purposes of this description, nodes 20 may "drop" traffic by transmitting a copy of the traffic to any appropriate components that are a part of or coupled to the relevant node 20. As a result, nodes 20 may drop traffic from mesh 10 by transmitting the traffic to these components while allowing the traffic to continue to downstream components on mesh 10. Each node 20 may drop and electrically convert traffic received on particular wavelength(s) at which that node is configured to receive traffic. Each node 20 may not drop or may discard traffic transmitted at other wavelengths. Once traffic is dropped from mesh 10, nodes 20 may provide optical-to-electrical conversion of the dropped traffic. Nodes 20 may then extract, based on addressing information in the traffic, portions of this traffic destined for client devices coupled to that node 20.

Although many network operators may appreciate the advantages of using optical light-trails in their mesh networks, they may be hesitant in adopting light-trail technology for a variety of reasons. For example, the components used to implement light-trails in an optical network, especially in a mesh network, may be too costly, too new and unreliable, or both. Thus, a need exists for a cost-efficient and reliable design configuration to implement light-trails in a mesh network.

Figure 2:
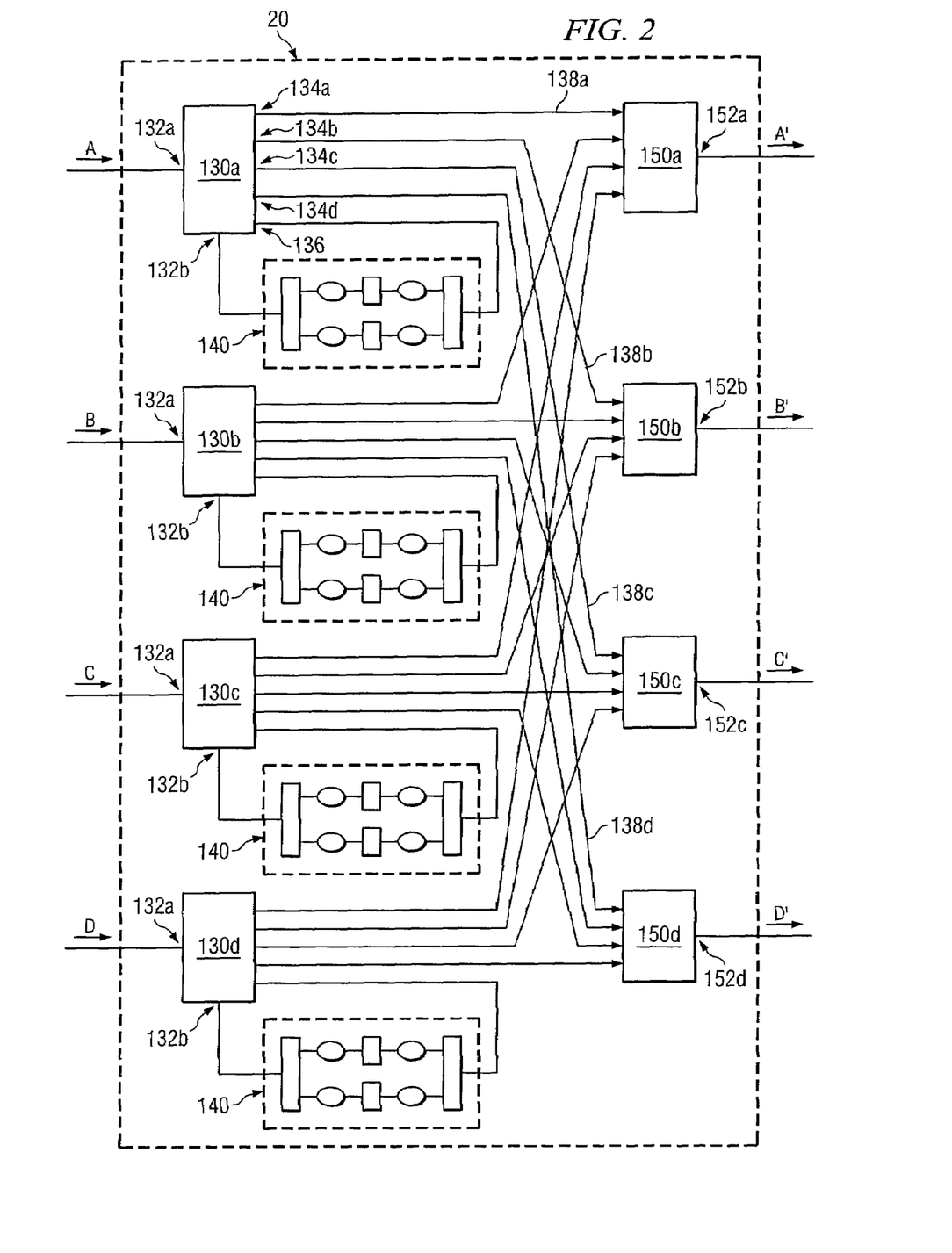
FIG. 2 is a block diagram illustrating a node in the mesh of FIG. 1 using a wavelength selective switch (WSS) design configuration according to a particular embodiment of the present invention.

FIG. 2 is a block diagram illustrating a node 20 in the mesh 10 of FIG. 1 using a wavelength selective switch (WSS) design configuration according to a particular embodiment of the present invention. In the illustrated embodiment, the inputs and outputs of node 20 have been reoriented to more clearly illustrate the cross-connect function of the node. However, input signals A-D and output signals A'-D' continue to refer to the same signals as those illustrated in FIG. 1. Again, it should be noted that node 20 may support any suitable number of inputs and outputs.

Node 20 comprises a WSS assembly 130 associated with each of its four inputs. Each WSS assembly has an associated light-trail access unit (LAU) 140. As described below, the WSS assembly and the associated LAU work in combination to receive input traffic at the associated input of node 20, to add and/or drop traffic in particular channels of the input signal, and to forward one or more channels of the input signal (and/or the added traffic) to one or more output switches 150. Each output switch is associated with a particular output of node 20.

Figure 3:
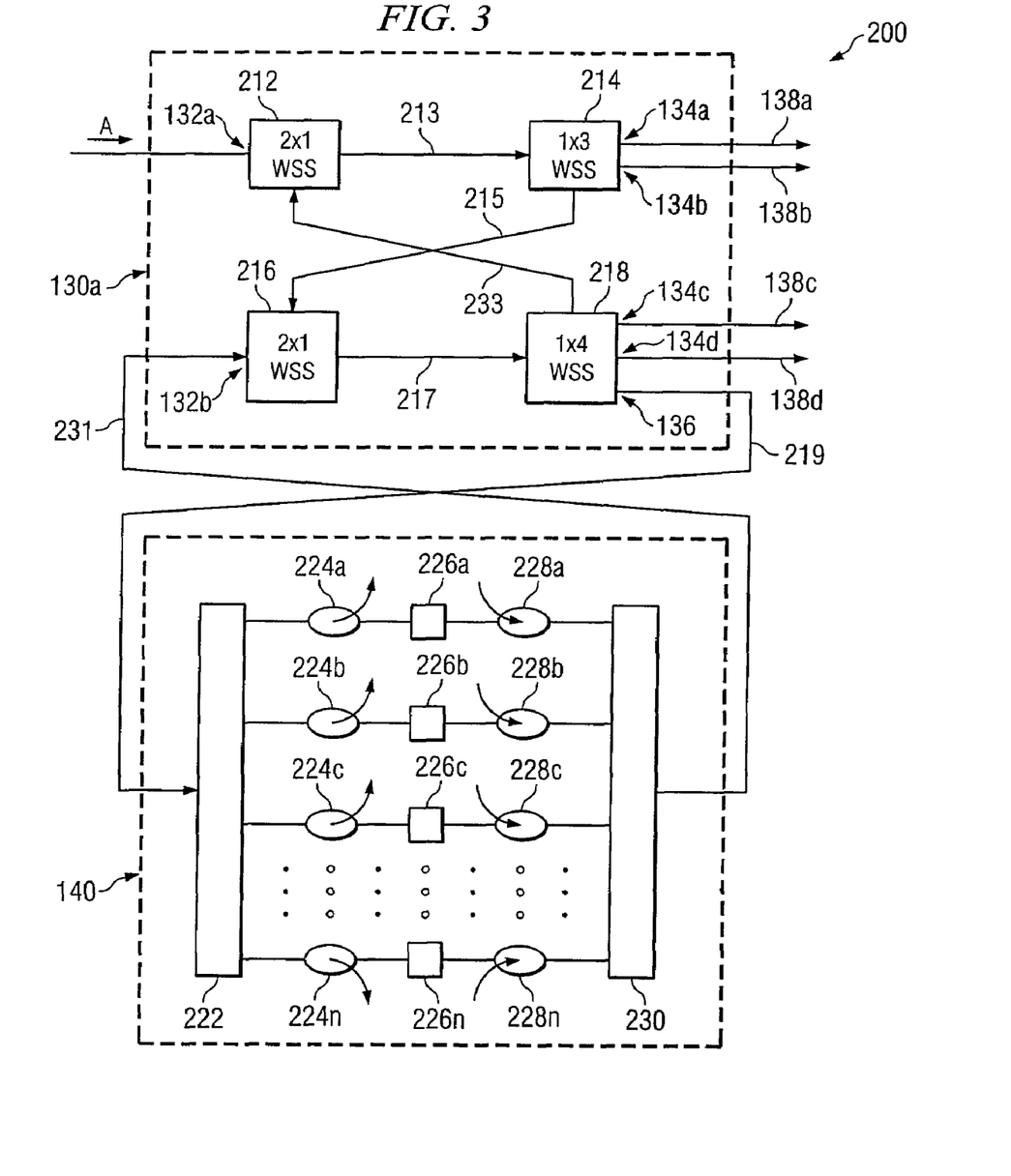
FIG. 3 is a block diagram illustrating, in more detail, the WSS design configuration of FIG. 2.

WSS assemblies 130 comprise WSS components which are described in more detail in conjunction with FIG. 3. Each WSS assembly 130 comprises at least two input ports, a signal input port 132a and an LAU input port 132b, and a number of output ports, ports 134 and LAU output port 136. Each WSS assembly 130 is operable to receive a signal at an input port 132, optionally add traffic to and/or drop traffic in one or more of the signal's wavelengths by sending traffic to a corresponding LAU 140, and forward received and/or added traffic in one or more wavelengths from output ports 134. For example, WSS assembly 130a may be operable to receive input signal A at input port 132a. WSS assembly 130a may be further operable to optionally send traffic in one or more of A's wavelengths through LAU port 136 to LAU 140, if, for example, traffic is to be passively added or dropped in one or more of those wavelengths. WSS assembly 130a may be further operable to receive the traffic added by and/or passed through LAU 140 through LAU port 132b and forward this traffic, as well as any of the original traffic in A that did not pass through LAU 140, to any one of output switches 150a-150d through corresponding output ports 134a-134d (and over corresponding fibers 138a-138d). Thus, for example, WSS assembly 130a may be operable to forward all of the traffic to one output switch, e.g., to output switch 150c via port 134c and over fiber 138c. Alternatively, WSS assembly 130a may be operable to forward traffic in particular wavelengths to one output switch, e.g., to output switch 150c via port 134c, and traffic in other wavelengths to one or more of the other output switches 150. In this way, multiple mesh light-trails established for different sets of nodes may be supported.

Each LAU 140 comprises a set of components, described in more detail in conjunction with FIG. 3, operable to receive traffic in one or more wavelengths from a corresponding WSS assembly 130. Each LAU 140 is operable to passively drop none, some, or all of the traffic that it receives from assembly 130. Additionally or alternatively, LAUs 140 may be further operable to block some or all of the traffic that they receive and/or add traffic in one or more wavelengths. It may be advantageous for an LAU 140 to block traffic, for example, to avoid optical interference, if the LAU is adding traffic in a wavelength carrying traffic from assembly 130. After adding, dropping, and/or blocking traffic, LAUs 140 may be further operable to forward any remaining traffic to LAU port 132b of the corresponding assembly 130.

Each output switch 150 may comprise any suitable switch, such as, for example, a WSS. Alternatively, output switch 150 might be a type of multiplexer or combiner. Each output switch 150 in node 20 may be operable to receive traffic from one or more of assemblies 130, combine the traffic, and forward the traffic through an associated output port 152. Thus, for example, output switch 150a may receive traffic in different wavelengths from each of assemblies 130a-130d, combine the traffic, and forward the traffic as signal A' through output port 152a. Signal A' may comprise traffic being communicated on one or more light-trails.

In operation, each WSS assembly 130 in node 20 may receive an input signal and optionally send the traffic in one or more of the signal's wavelengths to a corresponding LAU 140. LAU 140 may receive the traffic and passively drop none, some, or all of the traffic. Additionally or alternatively, LAU 140 may block some or all of the traffic and add traffic in one or more of the blocked wavelengths. After adding, dropping, and/or blocking traffic, LAU 140 may forward the non-blocked and newly-added traffic to its corresponding assembly 130. Each assembly 130 may then forward some or all of the traffic to one or more of output switches 150a-150d. Each output switch 150 may receive its traffic in particular wavelengths from one or more of assemblies 130, combine the traffic, and forward the traffic from its associated output port 152 (for example, to the node coupled to the particular output switch 150). In this way, mesh light-trails may be supported.

Modifications, additions, or omissions may be made to the node 20 described without departing from the scope of the disclosure. The components of the node 20 described may be integrated or separated according to particular needs. Moreover, the operations of the node 20 described may be performed by more, fewer, or other components without departing from the scope of the present disclosure.

As described above, node 20 may support mesh light-trails by being operable to passively add and/or drop traffic and redirect traffic from any input to any output. In addition, node 20 offers a design configuration that uses reliable and cost-efficient WSS components.

FIG. 3 is a block diagram illustrating, in more detail, the WSS design configuration 200 of FIG. 2. Configuration 200 comprises WSS assembly 130 and LAU 140. As discussed above, WSS assembly 130 may comprise any suitable WSS assembly operable to receive a signal, optionally add traffic to and/or drop traffic from that signal by sending traffic in one or more of the signal's wavelengths to a corresponding LAU 140, and forward the received and added traffic in particular wavelengths to any one of switches 150a-150d. Thus, WSS assembly 130 comprises at least two input ports, signal input port 132a and LAU input port 132b. Signal input port 132a is configured to receive the input signal to the node (e.g., signal A), and LAU input port 132b is configured to receive traffic from the LAU (added traffic and/or traffic passed-through the LAU). It should be noted, however, that assembly 130 may comprise any suitable number of additional input ports, and need not be limited to two. WSS assembly 130 may also comprise a plurality of output ports 134 and associated fibers 138 coupling the assembly 130 to a plurality of output switches 150. WSS assembly 130 may also comprise an LAU output port 136 and associated fiber 219, coupling the assembly 130 to LAU 140. It should be noted that although four output ports 134a-d and four output switches 150a-d are illustrated, assembly 130 may comprise any suitable number of output ports 134 coupled to any suitable number of output switches 150.

In the illustrated embodiment, WSS assembly 130 comprises four wavelength selective switches, 212, 214, 216, and 218. Switches 212, 214, 216, and 218 comprise any suitable WSS, each WSS having a particular 1×N or M×1 configuration (where N is the number of output ports and M is the number of input ports). In the illustrated embodiment, WSS 212 and WSS 216 are 2×1 WSSs, WSS 214 is a 1×3 WSS and WSS 218 is a 1×4 WSS. However, any suitable types of WSS may be used for any particular switch. In addition, any suitable number of WSSs may be used. For example, the number of WSSs, as well as their types, may be modified to increase or decrease the number of output ports for assembly 130. In particular embodiments, WSSs 212, 214, 216, and 218 may be non-blocking and hitless, preventing the smudging of optical signals.

In the illustrated embodiment, WSS 212 is configured to receive a WDM signal (e.g., one of signals A, B, C, or D) at input port 132a and selectively forward the traffic in some or all of the constituent wavelengths of the signal to WSS 214. WSS 212 is also configured to receive a signal from WSS 218 comprising traffic from LAU 140 of node 20 and destined for output ports 134a and/or 134b. If traffic is received at WSS 212 from WSS 218, WSS 212 selectively combines this traffic with some or all of the traffic received at input port 132a and forwards some or all of the combined traffic over fiber 213 to WSS 214. It should be noted that, in alternative embodiments, free-space optics or other suitable devices may replace one or more of the fibers (including, for example, fiber 213) in configuration 200.

WSS 214 is configured to receive traffic from WSS 212 and selectively forward some or all of the traffic through output ports 134a and/or 134b and/or to WSS 216 over fiber 215. Thus, WSS 214 may selectively forward the traffic destined for output switches 150a and 150b through ports 134a and 134b, respectively. How this traffic is handled after being forwarded through ports 134a and 134b and over associated fibers 138a and 138b has been described above in conjunction with FIG. 2, and thus will not be described again. Any traffic to be directly sent to output ports 134c and/or 134d from input port 132a may be forwarded by WSS 214 over fiber 215 to WSS 216. Traffic to be sent to LAU 140 is also forwarded by WSS 214 over fiber 215 to WSS 216, to be forwarded eventually to LAU 140.

WSS 216 is configured to receive traffic from WSS 214 and selectively forward some or all of the traffic over fiber 217 to WSS 218. WSS 216 may also be operable to receive a signal from LAU 140 at LAU input port 132b comprising traffic added at or passed through LAU 140 and destined for one or more of output ports 134a, 134b, 134c, and 134d. If traffic is received at WSS 216 from LAU 140, WSS 216 may be operable to combine this traffic with some or all of the traffic received from WSS 214 and forward some or all of the combined traffic over fiber 217 to WSS 218. As noted above, in particular embodiments, WSS 216 may be non-blocking and hitless, preventing the smudging of the optical signal.

WSS 218 is configured to receive traffic from WSS 216 and forward the traffic destined for output ports 134c and/or 134d to those ports. If WSS 218 receives traffic added at or passed-through LAU 140 and destined for output ports 134a and/or 134b, WSS 218 forwards that traffic to WSS 212 over fiber 231.1f WSS 218 receives traffic to be sent to LAU 140, WSS 218 forwards that traffic through LAU port 136 to LAU 140 over output fiber 219. The handling of any traffic forwarded through output ports 134c and/or 134d has been described above in conjunction with FIG. 2, and thus will not be described again.

LAU 140 is configured to passively drop and/or add traffic at particular wavelengths. In the illustrated embodiment, LAU 140 comprises a demultiplexer 222, drop couplers 224, switches 226, add couplers 228, and a multiplexer 230. However, in alternative embodiments, LAU 140 may comprise any suitable components to passively drop and/or add traffic.

Demultiplexer 222 may comprise any suitable demultiplexer configured to receive a signal from WSS 218 and demultiplex the signal into its constituent wavelengths. Demultiplexer 222 forwards the traffic in each wavelength to a corresponding drop coupler, one of drop couplers 224a-224n.

Each drop coupler 224 may comprise any suitable coupler configured to receive traffic in a corresponding wavelength, split the traffic into a first copy and a second copy (each having substantially the same content), drop the first copy, and forward the second copy to a corresponding one of switches 226a-226n. Thus, each drop coupler 224 may passively drop any signal that it receives. Traffic dropped by drop coupler 224 may be received by an associated receiver, if destined for this particular node, and then forwarded to one or more clients of the node.

Switches 226 may comprise any suitable switches operable to selectively block traffic or allow traffic to pass. A switch 226 may block traffic at a particular wavelength, if, for example, traffic is to be added at that particular wavelength at LAU 140, thereby avoiding optical interference. A switch 226 may pass traffic, if, for example, no traffic will be added at that particular wavelength at LAU 140.

Each add coupler 228 may comprise any suitable coupler configured to receive any traffic passed by switch 226. Alternatively, if switch 226 passes no traffic to add coupler 228 (if, for example, switch 226 blocks the traffic), add coupler 228 is configured to receive local add traffic and to add it to the line. This add local traffic may be received from an associated transmitter. Add coupler 228 may be operable to do so passively. Add coupler 228 forwards the received pass-through or add traffic to multiplexer 230.

Multiplexer 230 may comprise any suitable multiplexer configured to receive any traffic forwarded by add couplers 228a-228n and combine the traffic into one signal. Multiplexer 230 may be further operable to forward the combined signal from LAU 140 to LAU input port 132b of WSS assembly 130.

In operation, an input signal is received by WSS 212 at input port 132a. For illustrative purposes only, assume the signal carries traffic at four wavelengths, $\lambda_1$-$\lambda_4$, where each wavelength is associated with a separate light-trail. Assume also that the signal's traffic in $\lambda_1$ is destined to pass through output port 134a (and will not be dropped at node 20), the traffic in $\lambda_2$ is to be dropped at node 20 and also forwarded through output port 134b, the traffic in $\lambda_3$ is to be dropped at node 20 and traffic is to be added at $\lambda_3$ at node 20 and forwarded through output port 134c, and the signal's traffic in $\lambda_4$ is destined to pass through output port 134d (and will not be dropped at node 20).

After WSS 212 receives the input signal, WSS 212 forwards the signal to WSS 214 over fiber 213. WSS 214 receives the signal, forwards the traffic in $\lambda_1$ to output port 134a and forwards the traffic in $\lambda_2$-$\lambda_4$ over fiber 215 to WSS 216. WSS 216 receives the traffic in $\lambda_2$-$\lambda_4$ and forwards the traffic over fiber 217 to WSS 218. WSS 218 receives the traffic in $\lambda_2$-$\lambda_4$, forwards the traffic in $\lambda_2$-$\lambda_3$ from LAU port 136 over fiber 219 to demultiplexer 222 at LAU 140, and forwards the traffic in $\lambda_4$ to output port 134d. At LAU 140, demultiplexer 222 receives the signal comprising traffic in $\lambda_2$ and $\lambda_3$, demultiplexes the signal into its constituent wavelengths ($\lambda_2$ and $\lambda_3$), forwards the traffic in $\lambda_2$ to drop coupler 224b, and forwards the traffic in $\lambda_3$ to drop coupler 224c.

Drop coupler 224b splits the traffic in $\lambda_2$ into two copies, drops one of the copies, and forwards the other copy to switch 226b. Switch 226b receives the copy and allows the copy to pass to add coupler 228b. Add coupler 228b receives the copy and forwards the copy to multiplexer 230.

Drop coupler 224c splits the traffic in $\lambda_3$ into two copies, drops one of the copies, and forwards the other copy to switch 226c. Switch 226c blocks the copy, thereby avoiding interference that may result from adding traffic at $\lambda_3$ at add coupler 228c. Local traffic at $\lambda_3$ is added at add coupler 228c and forwarded to multiplexer 230.

Multiplexer 230 receives the traffic in $\lambda_2$ and $\lambda_3$, combines the traffic into one signal, and forwards the signal from LAU 140 over fiber 231 to LAU input port 132b of WSS assembly 130. WSS 216 receives the signal at LAU input port 132b and forwards the signal to WSS 218 over fiber 217. WSS 218 receives the signal, forwards the traffic in $\lambda_2$ over fiber 233 to WSS 212, and forwards the traffic in $\lambda_3$ to output port 134c. WSS 212 receives the traffic in $\lambda_2$ and forwards the traffic over fiber 213 to WSS 214. WSS 214 receives the traffic in $\lambda_2$ and forwards the traffic to output port 134b. In this way, using reliable and cost-efficient 1×N and M×1 WSS components, WSS design configuration 200 may forward any input traffic to any output port and may passively add and drop traffic, thereby allowing node 20 to support mesh light-trails.

Modifications, additions, or omissions may be made to the WSS design configuration 200 described without departing from the scope of the disclosure. The components of the WSS design configuration 200 described may be integrated or separated according to particular needs. Moreover, the operations of the WSS design configuration 200 described may be performed by more, fewer, or other components without departing from the scope of the present disclosure.

Although the present disclosure has been described with several embodiments, various changes and modifications may be suggested to one skilled in the art. It is intended that the present disclosure encompass such changes and modifications as fall within the scope of the appended claims.

What is claimed is:

1. A node included in one or more light-trails in a mesh network, each light-trail enabling a plurality of nodes included in the light-trail to share the use of an optical wavelength to transmit traffic between the nodes included in the light-trail, the node comprising:
   a plurality of wavelength selective switch (WSS) assemblies each configured to receive traffic in one or more light-trails via an associated input port of the node; and
   a plurality of light-trail access units (LAUs), each LAU associated with a WSS assembly, where:
      each WSS assembly comprises four WSSs coupled together to form the WSS assembly, two input ports, and more than two output ports, where each light trail is associated with an output port, the associated output port corresponding to the next node in the particular light-trail;
      each WSS assembly is configured to send traffic in one or more of the light-trails via one of the output ports to the associated LAU;
      each LAU is configured to:
         receive traffic in one or more of the light-trails from the associated WSS assembly;
         demultiplex the received traffic into different wavelengths;
         drop traffic in one or more of the wavelengths of the received traffic;
         pass through traffic in one or more of the wavelengths of the received traffic;
         add traffic to one or more of the wavelengths of the received traffic;
         multiplex the added traffic with the passed-through traffic; and
         forward the multiplexed traffic to the associated WSS assembly; and
      each WSS assembly is further configured to receive the traffic from the associated LAU at the second input port and send the traffic in a particular light-trail through the output port that corresponds to the next node in the particular light-trail.

2. The node of claim 1, further comprising a plurality of output switches, each output switch configured to receive traffic from two or more of the WSS assemblies, to combine the received traffic, and to forward the combined traffic as an output of the node.

3. The node of claim 1, wherein each LAU is configured to drop the traffic and add the traffic passively.

4. A node included in one or more light-trails in a mesh network, each light-trail enabling a plurality of nodes included in the light-trail to share the use of an optical wavelength to transmit traffic between the nodes included in the light-trail, the node comprising:
   a plurality of wavelength selective switch (WSS) assemblies each configured to receive traffic in one or more light-trails via an associated input port of the node; and
   a plurality of light-trail access units (LAUs), each LAU associated with a WSS assembly, where:
      each WSS assembly comprises a plurality of output ports, where each light trail is associated with an output port, the associated output port corresponding to the next node in the particular light-trail;
      each WSS assembly is configured to send traffic in one or more of the light-trails via one of the output ports to the associated LAU;
      each LAU is configured to:
         receive traffic in one or more of the light-trails from the associated WSS assembly;
         drop traffic in one or more of the wavelengths of the received traffic;
         pass through traffic in one or more of the wavelengths of the received traffic;
         add traffic to one or more of the wavelengths of the received traffic; and
         forward any added or passed-through traffic to the associated WSS assembly; and
      each WSS assembly is further configured to receive the traffic from the associated LAU and send the traffic in a particular light-trail through the output port that corresponds to the next node in the particular light-trail.

5. The node of claim 4, further comprising a plurality of output switches, each output switch configured to receive traffic from two or more of the WSS assemblies, to combine the received traffic, and to forward the combined traffic as an output of the node.

6. The node of claim 4, wherein each LAU comprises:
   a demultiplexer configured to demultiplex the traffic that the LAU receives from the associated WSS assembly into the traffic's constituent wavelengths;
   a plurality of drop couplers, each drop coupler configured to receive traffic in one of the wavelengths and configured to split the received traffic into two copies, drop a first copy of the traffic, and forward a second copy along the LAU;
   a plurality of add couplers, each add coupler associated with a particular drop coupler and configured to either pass traffic or add traffic;
   a plurality of switches, each switch associated with a particular add coupler and a particular drop coupler and configurable to terminate traffic or pass traffic, each switch positioned downstream of a corresponding drop coupler and upstream of a corresponding add coupler; and
   a multiplexer configured to multiplex any added and passed-through traffic and forward the traffic to the associated assembly.

7. The node of claim 4, wherein the at least one WSS assembly comprises two input ports and more than two output ports.

8. The node of claim 4, wherein each LAU is configured to drop the traffic and add the traffic passively.

9. A method for channeling traffic at a node included in one or more light-trails in a mesh network, each light-trail enabling a plurality of nodes included in the light-trail to share the use of an optical wavelength to transmit traffic between the nodes included in the light-trail, the method comprising:

receiving traffic in one or more light-trails at one or more wavelength selective switch (WSS) assemblies;

sending traffic in one or more of the light-trails received at one of the WSS assemblies to a light-trail access unit (LAU) associated with the WSS assembly;

dropping traffic in one or more of the wavelengths of the traffic received at the LAU;

adding local traffic to one or more of the wavelengths of the traffic received at the LAU;

passing through traffic in one or more of the wavelengths of the received traffic at the LAU;

forwarding any added or passed-through traffic to the associated WSS assembly;

receiving the traffic from the associated LAU;

sending the traffic in a particular light-trail through an output port of the WSS assembly that corresponds to the next node in the particular light-trail;

receiving traffic from two or more of the WSS assemblies at an output switch;

combining the received traffic at the output switch; and     forwarding the combined traffic as an output of the node.

10. The method of claim 9, further comprising:

after sending traffic to the LAU, demultiplexing the traffic at the LAU into the traffic's constituent wavelengths; and     multiplexing any added and passed-through traffic at the LAU.

11. The method of claim 9, wherein the WSS assemblies comprise two input ports and more than two output ports.

12. The method of claim 9, wherein the traffic is dropped and added passively at the LAU.

13. A node included in an optical network, comprising:

a first light access unit operable to add or drop local traffic;

a second light access unit operable to add or drop local traffic;

a first wavelength selective switch (WSS) assembly communicatively coupled to the first light access unit and comprising at least four WSSs coupled together to form the WSS assembly, at least two input ports, and at least four output ports, the four WSSs configured to direct any input traffic in any wavelength received at one of the input ports to the first light access unit and/or to any of the output ports;

a second WSS assembly communicatively coupled to the second light access unit and comprising at least four WSSs, at least two input ports, and at least four output ports, the four WSSs configured to direct any input traffic in any wavelength received at one of the input ports to the second light access unit and/or to any of the output ports; and     at least one output switch configured to receive traffic from at least the first WSS assembly and the second WSS assembly, to combine the received traffic, and to forward the combined traffic as an output of the node.

14. The node of claim 13, wherein the first light access unit is configured to add or drop the traffic passively.

\* \* \* \* \*

UNITED STATES PATENT AND TRADEMARK OFFICE
CERTIFICATE OF CORRECTION

PATENT NO.         : 7,715,711 B2  
APPLICATION NO.    : 11/420380  
DATED              : May 11, 2010  
INVENTOR(S)        : Ashwin A. Gumaste Page 1 of 1

It is certified that error appears in the above-identified patent and that said Letters Patent is hereby corrected as shown below:

Column 7, Line 44, after "fiber" delete "231.1$f$" and insert -- 231. If --.

Signed and Sealed this  
Fourth Day of October, 2011

David J. Kappos  
*Director of the United States Patent and Trademark Office*